United States Patent [19]
Takasuka et al.

[11] Patent Number: 5,235,952
[45] Date of Patent: Aug. 17, 1993

[54] IGNITION TIMING CONTROL SYSTEM FOR INTERNAL COMBUSTION ENGINES

[75] Inventors: Yoshitaka Takasuka; Yasuyuki Kimura; Akira Kato, all of Wako, Japan

[73] Assignee: Honda Giken Kogyo Kabushiki Kaisha, Tokyo, Japan

[21] Appl. No.: 981,681

[22] Filed: Nov. 25, 1992

[30] Foreign Application Priority Data

Nov. 29, 1991 [JP] Japan .................................. 3-340297

[51] Int. Cl.⁵ .............................................. F02P 5/14
[52] U.S. Cl. .................................................. 123/425
[58] Field of Search .................. 123/425, 435; 73/35, 73/35 K, 35 P, 117.3; 364/431.08, 431.07

[56] References Cited

U.S. PATENT DOCUMENTS

| | | | |
|---|---|---|---|
| 5,107,813 | 4/1992 | Inoue et al. | 123/425 |
| 5,134,980 | 8/1992 | Sakakibara et al. | 123/425 |
| 5,144,929 | 9/1992 | Hosoya et al. | 123/425 |
| 5,165,378 | 11/1992 | Miyashita | 123/425 |
| 5,170,762 | 12/1992 | Tsutsumi et al. | 123/425 |
| 5,186,145 | 2/1993 | Sakakibara | 123/425 |

Primary Examiner—Raymond A. Nelli
Attorney, Agent, or Firm—Nikaido, Marmelstein, Murray & Oram

[57] ABSTRACT

An ignition timing control system for an internal combustion engine includes an ECU which calculates a knocking correction value in response to an output from a knocking sensor, and an advance limit value in response to engine operating conditions. The ECU operates to limit correction of the ignition timing of the engine in an advancing direction, beyond the advance limit value when the knocking correction value exceeds the advance limit value. The ECU cancels the advance correction limitation when at least one of conditions of high coolant temperature, high intake air temperature, low coolant temperature, and low rotational speed is satisfied.

10 Claims, 9 Drawing Sheets

IGNITION TIMING CONTROL SYSTEM FOR INTERNAL COMBUSTION ENGINES

BACKGROUND OF THE INVENTION

1. Field of the Invention

This invention relates to an ignition timing control system for an internal combustion engine having means for prevention of knocking irrespective of the octane value of fuel used in the engine.

2. Prior Art

Generally, if a fuel having a low octane value is used in an internal combustion engine which is designed to operate on a fuel having a high octane value, knocking can occur with considerable frequency. To overcome this problem, an ignition timing control system for an internal combustion engine has been proposed by the assignee of the present application by Japanese Provisional Patent Publication (Kokai) No. 4-101067, which comprises means for detecting occurrence of knocking, and means for retarding the ignition timing when occurrence of knocking is detected In the proposed control system, a plurality of control zones different in the ignition timing control characteristic according to the octane value of a fuel used are provided, by which the amount of advance of ignition timing is restricted under predetermined conditions, and the ignition timing is separately controlled in each of the control zones selected by an ignition timing retarding amount determined according to the degree of occurrence of knocking. When load on the engine exceeds a predetermined value while knocking does not occur, the use of the control zones is canceled by making a changeover from a control zone which is currently applied to a control zone suitable for a fuel having a higher octane value, i.e. to a control zone where the ignition timing can be set to a more advanced value, to thereby enable to control the ignition timing in a manner suitable to the octane value of the fuel used without causing hunting in the controlled ignition timing.

However, in the above proposed system, whether or not the use of the control zones should be canceled is made only based upon the load condition of the engine. As a result, when the coolant temperature of the engine is high or when it is low, or when the engine rotational speed is low, or when the intake air temperature of the engine is high, if the control zones are used for knocking control, no changeover of the control zone will be effected, once a control zone has been selected to correct the ignition timing in the retarding direction, which results in degraded driveability. More specifically, when the engine has not been warmed up, that is, when the engine coolant temperature is low, unstable combustion occurs. Therefore, if the ignition timing is corrected toward a retarded side by the use of the control zones on such an occasion, it will result in a drop in the engine output, promoting the instability of combustion. Particularly, when the engine rotational speed is low, the combustion can be remarkably unstable, largely degrading the driveability.

Further, when the engine intake air temperature is high or when the engine coolant temperature is high, the engine cannot fully afford to avoid knocking so that knocking can occur even when a fuel having a high octane value is used. In addition, occurrence of knocking can cause erroneous determination of the control zone to be selected. As a result, the ignition timing is restricted to a value on the retarded side with respect to a desired ignition timing, so that the engine output cannot be enhanced to a desired level even when a high octane value fuel is used.

SUMMARY OF THE INVENTION

It is the object of the invention to provide an ignition timing control system for an internal combustion engine, which is capable of avoiding degradation of the driveability due to unnecessary retardation of the ignition timing, as well as effectively preventing occurrence of knocking.

To attain the above object, the present invention provides an ignition timing control system for an internal combustion engine, including operating condition-detecting means for detecting operating conditions of the engine including a temperature of the engine, basic ignition timing-calculating means responsive to operating conditions of the engine detected by the operating condition detecting means, for calculating a basic value of ignition timing of said engine, knocking detecting means for detecting knocking occurring in the engine, knocking correction value-calculating means responsive to results of knocking detection from the knocking detecting means for calculating a knocking correction value for correcting the ignition timing of the engine, advance limit-calculating means responsive to operating conditions of the engine detected by the operating condition-detecting means, for calculating an advance limit value. and advance correction-limiting means for limiting correction of the ignition timing of the engine in a direction of advancing the ignition timing, beyond the advance limit value when the knocking correction value exceeds the advance limit value.

The ignition timing control system according to the invention is characterized by an improvement comprising advance correction limitation-canceling means operable when the temperature of the engine detected by the operating condition-detecting means exceeds a predetermined value, for canceling the limitation of correction of the ignition timing in the ignition timing-advancing direction by the advance correction-limiting means.

Preferably, the temperature of the engine is the temperature of engine coolant.

Alternatively, the temperature of the engine is the temperature of intake air supplied to the engine.

Preferably, the advance correction limitation-canceling means is also operable when the temperature of the engine detected by the operating condition-detecting means is below a second predetermined value lower than the first predetermined value, for canceling the limitation of correction of the ignition timing in the ignition timing-advancing direction by the advance correction-limiting means.

Also preferably, the operating condition-detecting means further includes rotational speed-detecting means for detecting the rotational speed of the engine. The advance correction limitation-canceling means is also operable when the rotational speed of the engine detected by the rotational speed-detecting means is below a predetermined value, for canceling the limitation of correction of the ignition timing in the ignition timing-advancing direction by the advance correction-limiting means.

In a preferred embodiment of the invention, the advance correction-limiting means comprises means for providing a plurality of control zones suitable for respective different octane values of fuel used in the engine, each of the control zones being defined by an upper limit value and a lower limit value of a retarding amount by which the ignition timing is to be corrected in an ignition timing-retarding direction.

The advance limit-calculating means calculates the lower limit of the retarding amount of each of the control zones as the advance limit value.

The advance correction limitation-canceling means cancels the limitation of correction of the ignition timing in the ignition timing-advancing direction, by changing one of the control zones which is suitable for a fuel having a lower octane value to another one of the control zones which is suitable for a fuel having a higher octane value.

The advance correction-limiting means limits the correction of the ignition timing of the engine in the direction of advancing the ignition timing, by changing one of the control zones which is suitable for a fuel having a higher octane value to another one of the control zones which is suitable for a fuel having a lower octane value.

The above and other objects, features and advantages of the invention will become more apparent from the ensuing detailed description taken in conjunction with the accompanying drawings.

DETAILED DESCRIPTION

The invention will now be described in detail with reference to the drawings showing an embodiment thereof.

Figure 1:
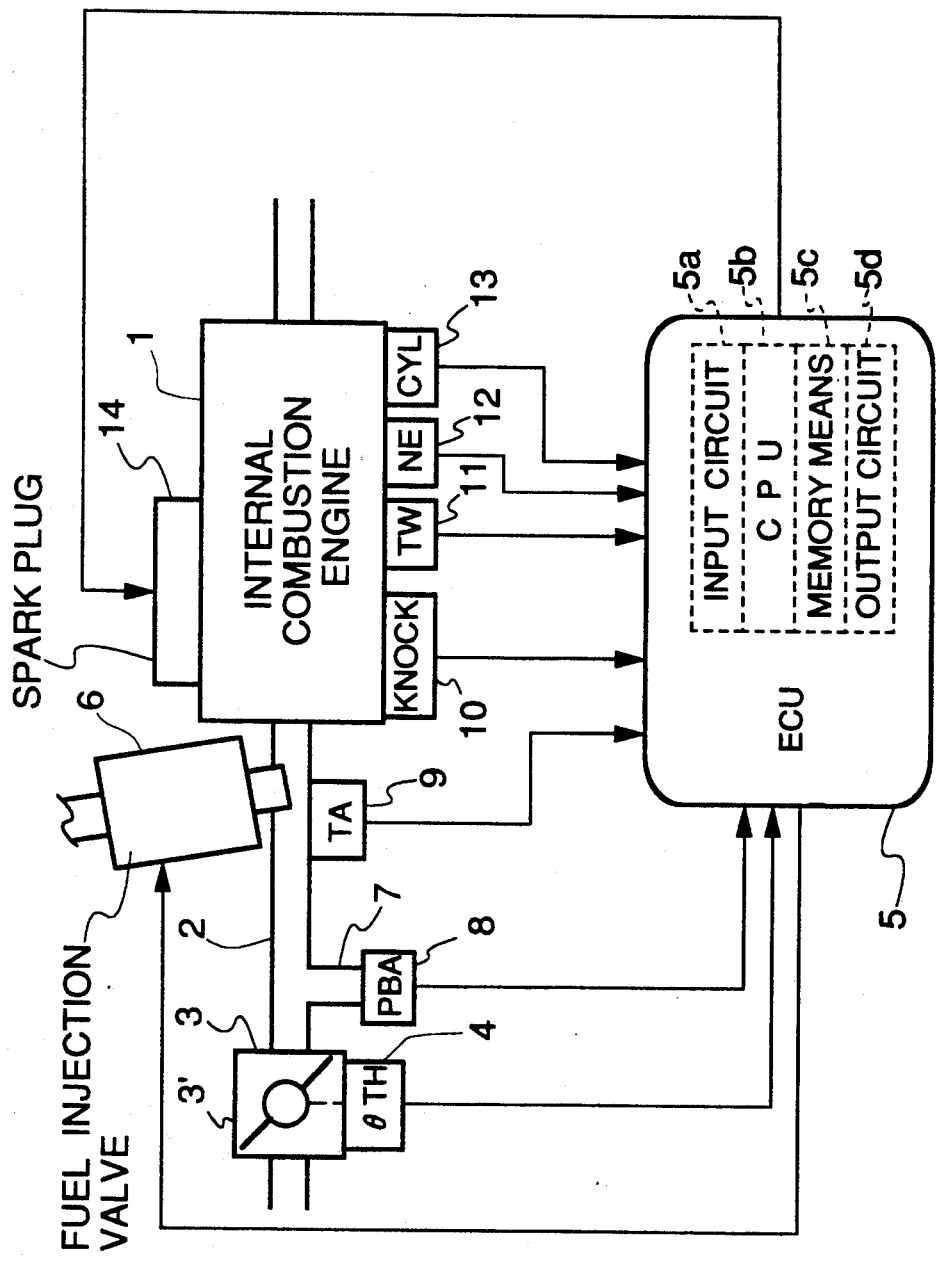
FIG. 1 is a block diagram showing the whole arrangement of an ignition timing control system incorporated in an internal combustion engine, according to an embodiment of the invention.

Referring first to FIG. 1, there is shown the whole arrangement of an ignition timing control system incorporated in an internal combustion engine, according to an embodiment of the invention.

In the figure, reference numeral 1 designates a DOHC straight type four cylinder engine (hereinafter simply referred to as "the engine"), each cylinder being provided with a pair of intake valves and a pair of exhaust valves, not shown. In an intake pipe 2 of the engine, there is arranged a throttle body 3 accommodating a throttle valve 3' therein. A throttle valve opening ($\theta$TH) sensor 4 is connected to the throttle valve 3' for generating an electric signal indicative of the sensed throttle valve opening and supplying same to an electronic control unit (hereinafter referred to as the ECU") 5.

Fuel injection valves 6 are each provided for each cylinder and arranged in the intake pipe 2 between the engine 1 and the throttle valve 3, and at a location slightly upstream of the intake valves. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is mounted at an end of a branch conduit 7 branching off from the intake pipe 2 at a location immediately downstream of the throttle valve 3', for sensing absolute pressure (PBA) within the intake pipe 2, and is electrically connected to the ECU 5 for supplying an electric signal indicative of the sensed absolute pressure PBA to the ECU 5.

An intake air temperature (TA) sensor 9 is inserted into the intake pipe 2 at a location downstream of intake pipe absolute pressure sensor 8 for supplying an electric signal indicative of the sensed intake air temperature TA to the ECU 5.

A knocking (KNOCK) sensor 10 of a piezo-electric type is inserted into a cylinder block of the engine 1 at a location in the vicinity of a top dead center position of each cylinder for detecting vibration of the engine caused by knocking and supplying an electric signal indicative of the detected vibration to the ECU 5.

An engine coolant temperature sensor (TW) sensor 11, which may be formed of a thermistor or the like, is mounted in the coolant-filled cylinder block of the engine for supplying an electric signal indicative of the sensed engine coolant temperature TW to the ECU 5.

An engine rotational speed (NE) sensor 12 and a cylinder-discriminating (CYL) sensor 13 are arranged in facing relation to a camshaft or a crankshaft of the engine 1, neither of which is shown. The NE sensor 11 generates a pulse as a TDC signal pulse at each of predetermined crank angles whenever the crankshaft rotates through 180 degrees, while the CYL sensor 12 generates a pulse at a predetermined crank angle of a particular cylinder of the engine, both of the pulses being supplied to the ECU 5.

A spark plug 14 for each cylinder of the engine 1 is electrically connected to the ECU 5 to have ignition timing thereof controlled by a signal supplied therefrom.

The ECU 5 comprises an input circuit 5a having the functions of shaping the waveforms of input signals from various sensors mentioned above, shifting the voltage levels of sensor output signals to a predetermined level, converting analog signals from analog-output sensors to digital signals, and so forth, a central processing unit (hereinafter referred to as the "CPU") 5b, memory means 5c formed of a ROM storing various operational programs which are executed by the CPU 5b, and various maps, referred to hereinafter, and a RAM for storing results of calculations therefrom, etc., an output circuit 5d which outputs driving signals to the fuel injection valves 6 and the spark plugs 14.

The CPU 5b calculates a valve opening period or fuel injection period TOUT over which the fuel injection valves 6 are to be opened, and also controls the ignition timing $\theta$IG in response to operating conditions of the engine, while effecting retarding thereof to avoid occurrence of knocking when required.

Figure 2:
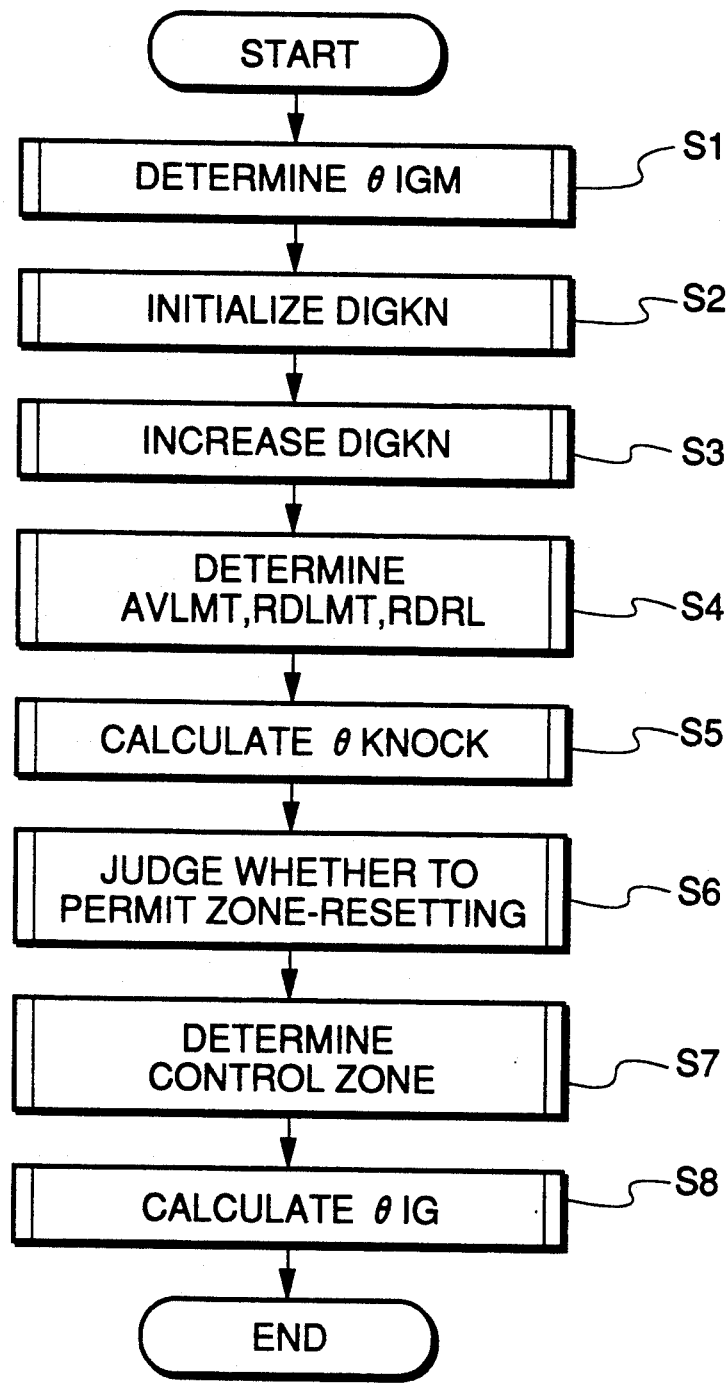
FIG. 2 is a flowchart showing a main routine of an ignition timing control program for carrying out ignition timing control by the ignition timing control system shown in FIG. 1.

FIG. 2 shows a main routine of an ignition timing control program for calculating the ignition timing.

First, at a step S1, a basic ignition timing advance value (basic ignition timing) $\theta$IGM is determined in synchronism with generation of each TDC signal pulse. The basic ignition timing advance value $\theta$IGM is determined as a function of engine operating parameters, e.g. the engine rotational speed NE and the intake pipe absolute pressure PBA representative of load on the engine. In the present embodiment, the basic ignition timing advance value $\theta$IG is determined by retrieving an ignition timing map, not shown, stored in the memory means 5c according to the engine rotational speed NE and the intake pipe absolute pressure PBA.

Then, at a step S2, a correction value-determining variable DIGKN is initialized in synchronism with generation of a TDC signal pulse. The correction value-determining variable DIGKN is a variable used in calculating a knocking correction value $\theta$KNOCK which is set in response to occurrence of knocking. In the present embodiment, the variable DIGKN is initialized in each of three control zones having different ignition timing control characteristics suitable to respective octane values of the fuel used, the control zones being described in detail hereinafter.

At the following step S3, changing of the correction value-determining variable DIGKN initialized at the step S2, in an ignition timing retarding direction is carried out (ignition timing-retarding modification).

Figure 3:
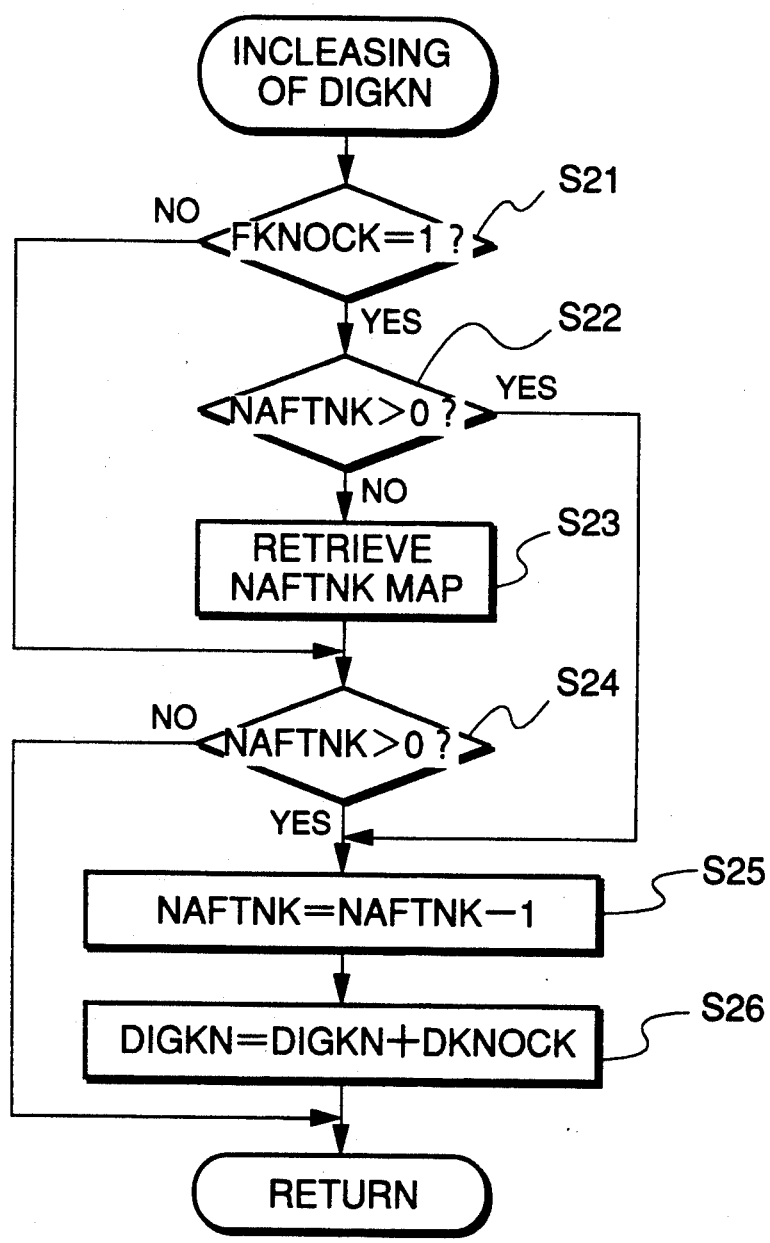
FIG. 3 is a flowchart showing a subroutine for ignition timing-retarding modification of a correction value-determining variable DIGKN.
Figure 4:
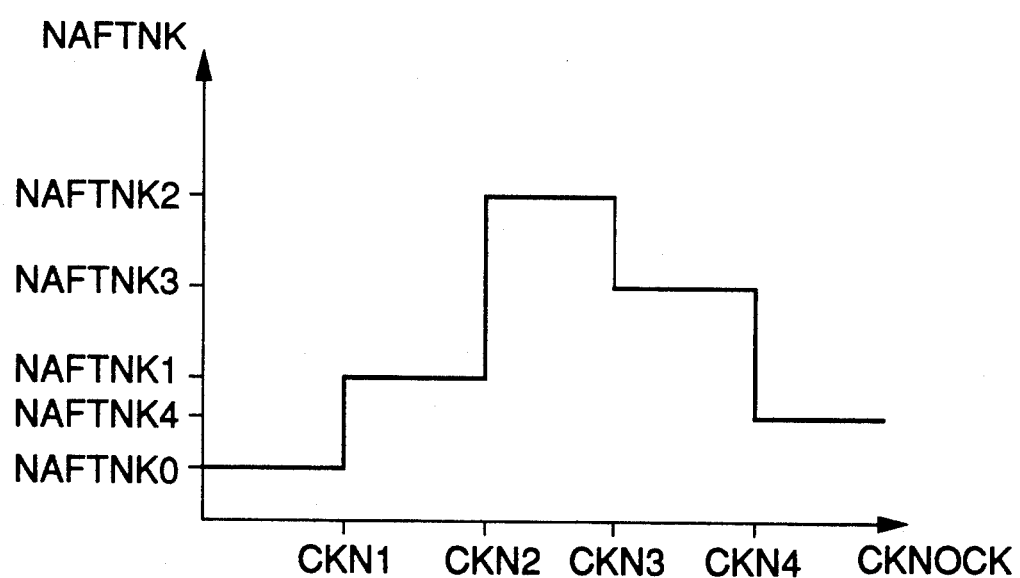
FIG. 4 is an NAFTNK map for determining a continuous retarded ignition time number NAFTNK.

FIG. 3 shows a subroutine for ignition timing-retarding modification of the variable DIGKN, which is executed in synchronism with generation of each TDC signal pulse. First, at a step S21, it is determined whether or not a flag FKNOCK, which is set to a value of 1 upon occurrence of knocking, assumes the value of 1 to thereby determine whether knocking has occurred. If the answer is negative (NO), i.e. if knocking has not occurred, the program jumps to a step S24. If the answer is affirmative (YES), i.e. if knocking has occurred, it is determined at a step S22 whether or not a continuous retarded ignition time number NAFTNK for continuous retarded ignitions, which is indicative of the number of times of ignitions at retarded timing which are to be continuously effected, is greater than 0. If the answer is affirmative (YES), i.e. if NAFTNK>0, the program jumps to a step S25, whereas if the answer is negative (NO), i.e. if NAFTNK$\leq$0, a value of the retarded ignition time number NAFTNK is read from an NAFTNK map. The NAFTNK map is set, e.g. as shown in FIG. 4, such that optimum values NAFTNK0 to NAFTNK4 of the retarded ignition time number NAFTNK are provided, corresponding, respectively, to count values CKN1 to CKN4 of a knocking frequency counter CKNOCK. The knocking frequency counter CKNOCK counts a number of times of occurrence of knocking within a time period corresponding to a predetermined number of times of ignition effected (e.g. 120).

Then, the program proceeds to the step S24, where it is determined whether or not the read time number NAFTNK is greater than 0. If the answer is negative (NO), i.e. if NAFTNK$\leq$0, the program is immediately terminated without effecting retarding correction of the variable DIGKN. If the answer is affirmative (YES), i.e. if NAFTNK>0, the value of NAFTNK is decremented by 1 at the step S254, and then a retard unit amount DKNOCK (e.g. 0.234°) is added to the variable DIGKN to thereby change the retarding modification amount in the increasing or retarding direction at a step S26, followed by terminating the program.

According to the program of FIG. 3 described above, the variable DIGKN is corrected in the increasing (retarding) direction by the retard unit amount DKNOCK until the time number NAFTNK set corresponding to the frequency of occurrence of knocking becomes 0.

Returning to the main routine, at a step S4 in FIG. 2, advance limits AVLMT (lower limit of a retarding amount), retard side-discriminating values RDLMT, and cancellation-determining (hereinafter referred to as "zone reset-determining") values (predetermined reference values; upper limit of the retarding amount) RDRL are determined. Each of the values AVLMT, RDLMT, RDRL comprises two or three values allocated to respective control zones, hereinafter referred to. In the present embodiment, three control zones are provided, in which the ignition timing control is carried out according to respective different control characteristics, i.e. respective different allowable advance limits. These zones are changed or canceled (reset) when the ignition timing retarding amount reaches the values RDRL, as hereinafter described.

Figure 5:
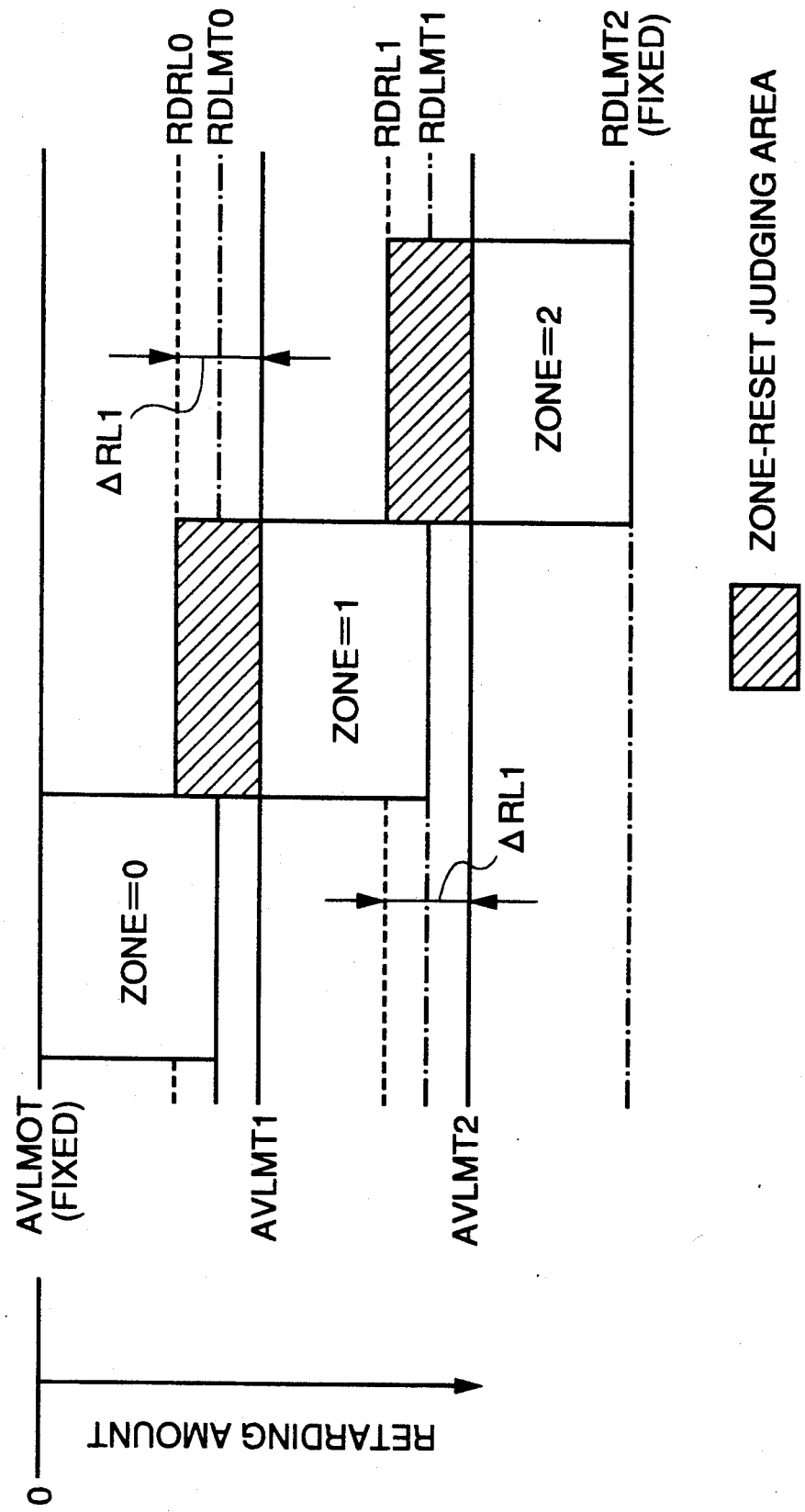
FIG. 5 is a diagram showing control zones.

In the present embodiment, as shown in FIG. 5, three control zones 0, 1 and 3 are provided, which correspond, respectively, to different octane values of fuel used in the engine. More specifically, the control zone 0 has an ignition timing control characteristic suitable for the use of fuel having an octane value of approximately 100, the control zone 1 approximately 95, and the control zone approximately 92. The greater the zone number, the later the ignition timing, as shown in FIG. 5, since the greater the zone number, the smaller the octane value of the fuel. Advance limits AVLMT0, AVLMT1 and AVLMT2 define the advance-side limits of the control zones 0 to 2, respectively. For example, basically, if the control zone 2 holds, the ignition timing cannot be set to an earlier timing than the advance limit AVLMT2. The advance limit AVLMT0 of the control zone 0 corresponds to the basic ignition timing $\theta$IGM, which means that the retarding amount is 0.

Further, the control zones 0 to 2 are provided with retard side-discriminating values RDLMT0, RDLMT1, and RDLMT2, respectively. The first and second retard side-discriminating values RDLMT0, RDLMT1 are variable and set by adding an addend, which is set in accordance with the engine rotational speed, as described hereinafter, to the advance limit AVLMT0 or AVLMT1 while the discriminating value RDLMT2 on the most retarded side is a fixed value. The correction value $\theta$KNOCK is controlled in these control zones between the advance limit AVLMTn (n=0 to 2) and the retard side-discriminating value RDLMTn (n=0 to 2).

Further, the control zones 0 to 2 are also provided with first and second zone reset-determining values RDRL0 and RDRL1, which are set to respective values obtained by decreasing the advance limits AVLMT1, AVLMT2 by amounts $\Delta$RL0, $\Delta$RL1, i.e. the values RDRL0, RDRL1 are more advanced than the advance limits AVLMT1, AVLMT2, by the amounts $\Delta$RL0, $\Delta$RL1, respectively. In FIG. 5, the hatched portions designate zone reset-judging regions in which it is determined whether or not the control zone should be changed from 2 to 1 or 1 to 0. The control zone is reset when the correction value $\theta$KNOCK assumes a value equal to or smaller or more advanced than the zone reset-determining values RDRL0, RDRL1 after it is corrected toward an advanced side from the advance limits AVLMT1, AVLMT2, respectively, and at the same time the load on the engine is greater than a predetermined value while knocking does not occur.

Figure 6:
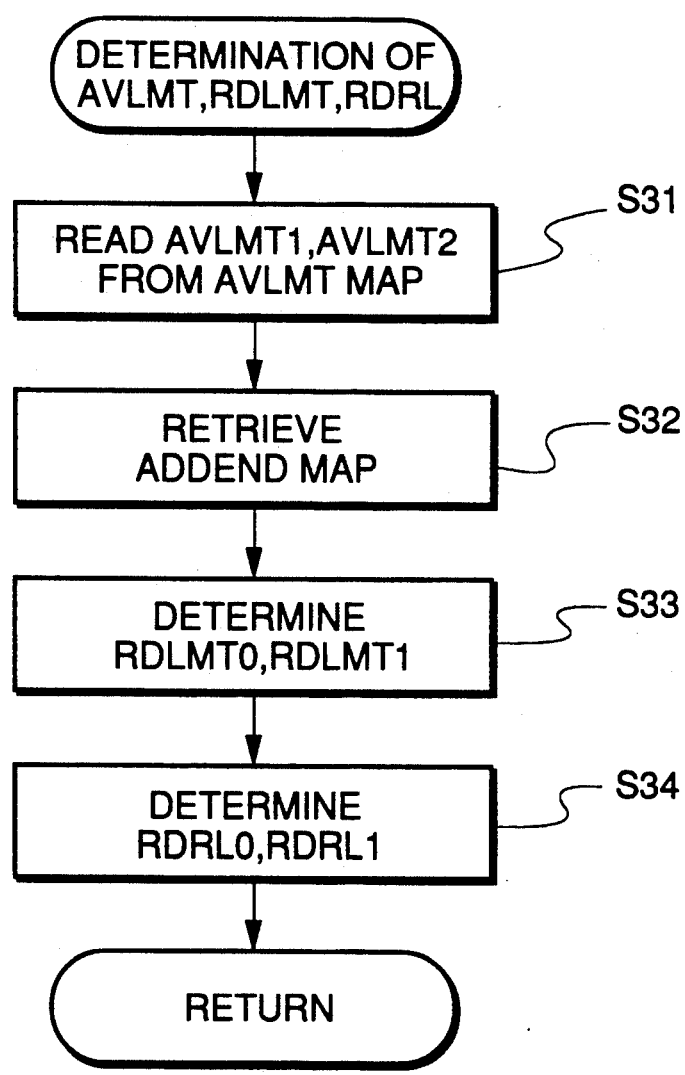
FIG. 6 is a flowchart showing a subroutine for determining control zone-defining values AVLMT, RDLMT and RDRL.

FIG. 6 shows a subroutine for determining the advance limits AVLMT1, AVLMT2, the first and second retard side-discriminating values RDLMT0, RDLMT1, and the first and second zone reset-determining values RDRL0, RDRL1. This subroutine is executed in synchronism with generation of each TDC signal pulse.

First, at a step S31, the advance limits AVLMT1, AVLMT2 are determined by retrieving an AVLMT map, not shown, which is set such that values of the advance limits AVLMT1, AVLMT2 are provided, which correspond, respectively, to values of the engine rotational speed NE and values of the engine intake pipe absolute pressure PBA.

Then, RDLMT-setting addend values and RDRL-setting addend values are determined by retrieving respective addend value maps, not shown, in which values of the addend values are provided, which correspond, respectively, to values of the engine rotational speed NE, at a step S32. Then, the RDLMT-setting addend values are added at a step S33 to the advance limits AVLMT1, AVLMT2 to obtain the first and second retard side-discriminating values RDLMT0, RDLMT1, and the RDRL-setting addend values are added at a step S34 to obtain the zone reset-determining values RDRL0, RDRL1, followed by terminating the subroutine and returning to the main routine in FIG. 2.

Then, at a step S5, the knocking correction value $\theta$KNOCK for correcting or retarding the ignition timing $\theta$IG for avoiding occurrence of knocking is calculated.

Figure 7:
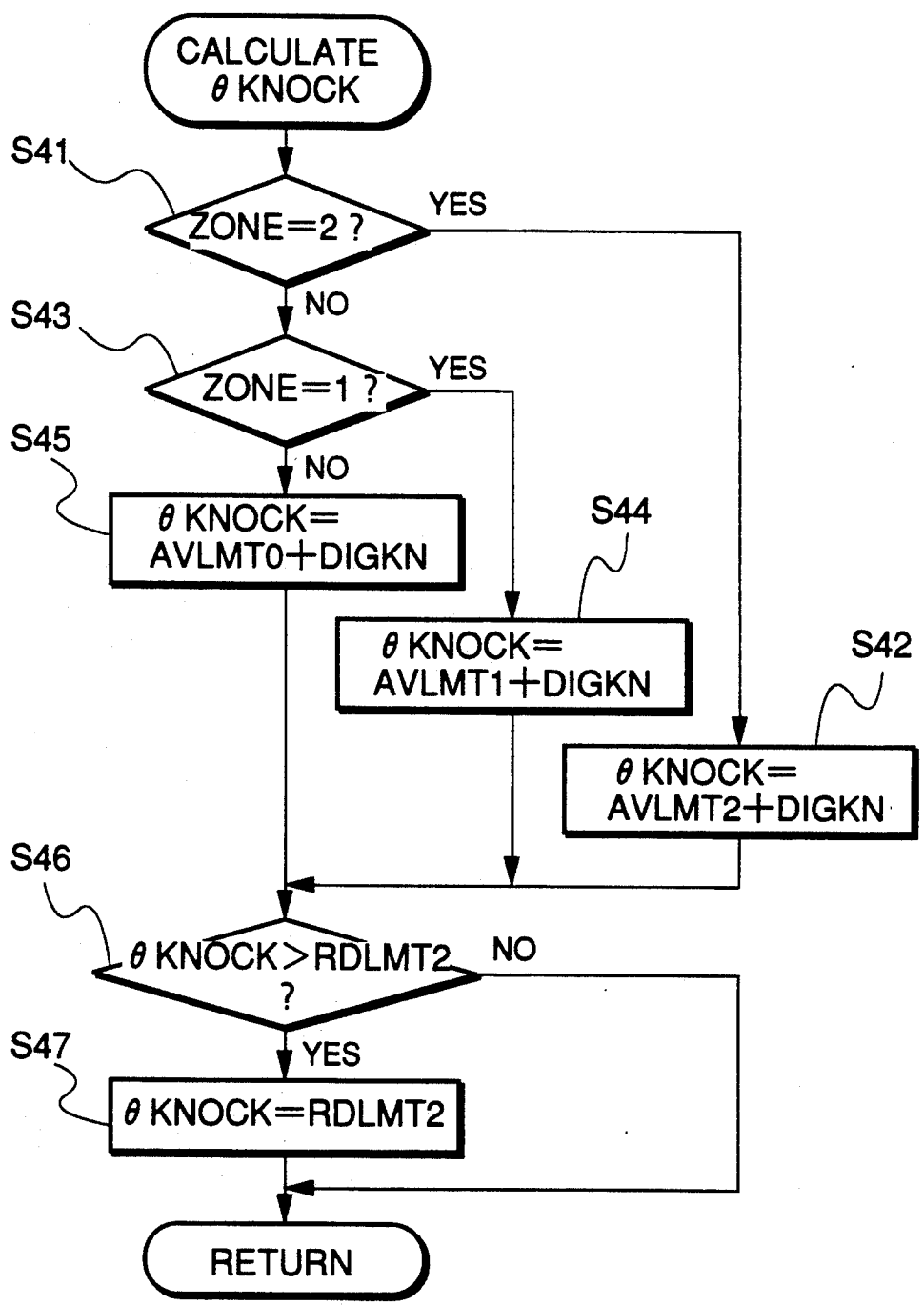
FIG. 7 is a flowchart showing a subroutine for determining a knocking correction value $\theta$KNOCK.

FIG. 7 shows a subroutine for calculating the knocking correction value $\theta$KNOCK, which is executed in synchronism with generation of each TDC signal pulse.

First, at a step S41, it is determined whether or not the control zone 2 is used in the present loop. If the answer is affirmative (YES), the correction value-determining variable DIGKN is added to the advance limit AVLMT2 of the control zone 2 to obtain the correction value $\theta$KNOCK, followed by the program proceeding to a step S46, whereas if the answer is negative (NO), the program proceeds to a step S43, where it is determined whether the control zone 1 is used in the present loop. If the answer to this question is affirmative (YES), the variable DIGKN is added to the advance limit AVLMT1 of the zone 1 to obtain the correction value $\theta$KNOCK, followed by the program proceeding to the step S46, whereas if the answer is negative (NO), which means the control zone 0 is used in the present loop, the variable DIGKN is added to the advance limit AVLMT0 (=$\theta$IGM) to obtain the correction value $\theta$KNOCK, followed by the program proceeding to the step s46.

At the step S46, it is determined whether or not the correction value $\theta$KNOCK obtained at the step S42, S44, or S45 is greater than the retard side-discriminating value RDLMT2 on the most retarded side defining the retard limit of the correction value $\theta$KNOCK. If the answer is negative (NO), the program is immediately terminated, whereas if the answer is affirmative (YES), the correction value $\theta$KNOCK is set to the retard side-discriminating value RDLMT2 at a step S47, followed by terminating the program and returning to the main routine.

Then, at a step S6 of the main routine, it is determined whether or not the control zones are to be determined, that is, whether or not conditions for determining the control zones to be selected are fulfilled.

Figure 8:
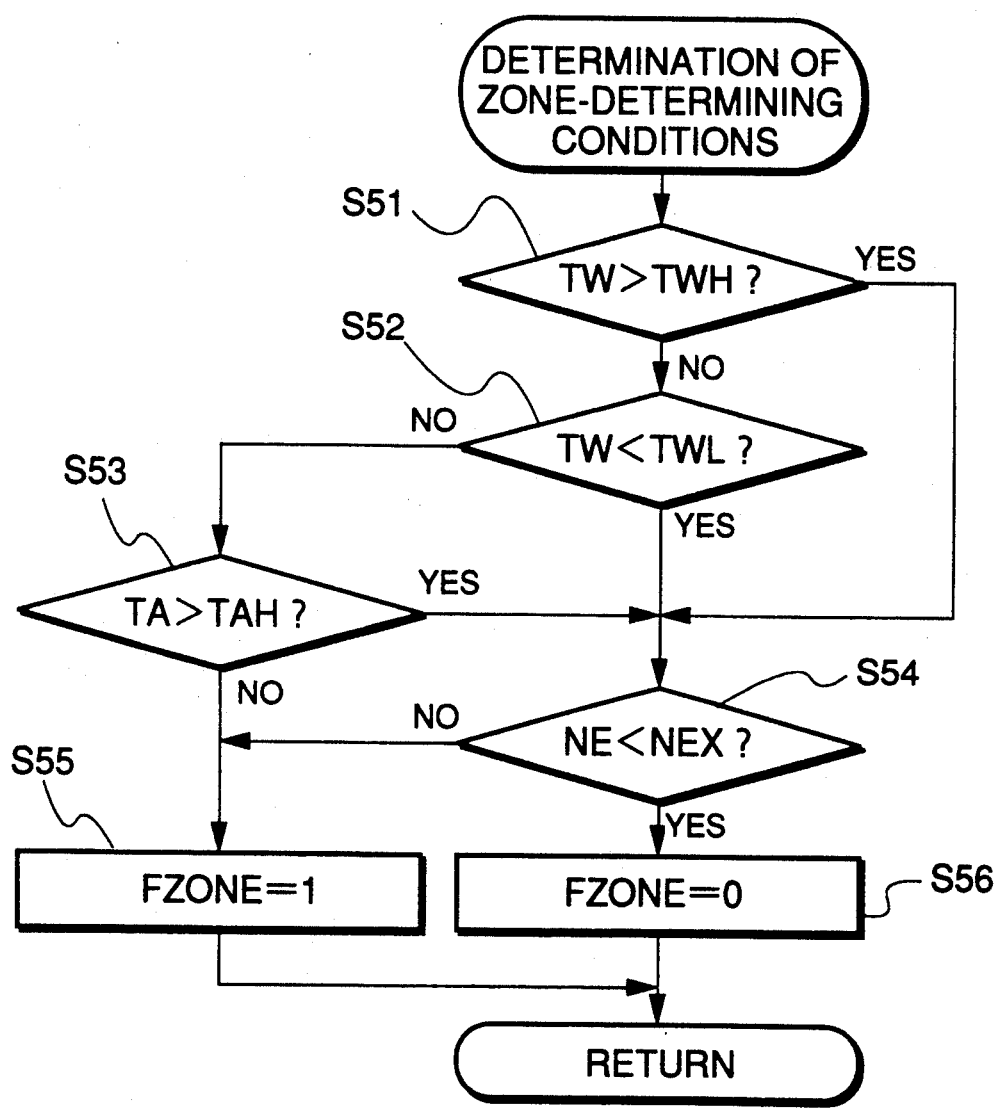
FIG. 8 is a flowchart showing a subroutine for determining conditions for determining control zones to be selected.

FIG. 8 shows a subroutine for determining the control zone-determining conditions.

First, at a step S51, it is determined whether or not the engine coolant temperature TW is higher than a predetermined upper limit TWH. The predetermined upper limit TWH is set at such a high as can cause an erroneous determination of the control zones to be selected, when the engine using a fuel having a high octane value is in a condition not affording to avoid knocking, e.g. 110° C.

If the answer to the question of the step S51 is affirmative (YES), the program jumps to a step S54, whereas if the answer is negative (NO), the program proceeds to a step S52, where it is determined whether or not the engine coolant temperature TW is lower than a predetermined lower limit TWL. The predetermined lower limit TWL is set such a low value as can cause unstable combustion within the engine, e.g. 75° C. If the answer to the question of the step S52 is affirmative (YES), the program proceeds to the step S54, whereas if the answer is negative (NO), the program proceeds to a step S53, where it is determined whether or not the intake air temperature TA is higher than a predetermined value TAH. The predetermined value TAH is set at such a high value as can cause an erroneous determination of the control zones to be selected, for a similar reason to the predetermined upper limit TWH, e.g. 85° C. If the answer to the question of the step S53 is affirmative (YES), the program proceeds to the step S54, whereas if the answer is negative (NO), a flag FZONE is set to "1", at a step S55, to thereby allow the ignition timing control to be carried out based upon the control zones, followed by the program returning to the main routine of FIG. 2.

On the other hand, if the answer to the question of at least one of the steps S51, S52, and S53 is affirmative (YES), it is determined at the step S54 whether or not the engine rotational speed NE is lower than a predetermined value NEX. The predetermined value NEX is set at such a low value as can cause unstable combustion within the engine, e.g. 1,000 rpm. If the answer to the question of the step S54 is negative (NO), the flag FZONE is set to "1", whereas if the answer is affirmative (YES), the flag is set to "0", to thereby inhibit the determination of control zones, followed by the program returning to the FIG. 2 main routine.

In the above described manner, when the engine is operating in at least one of conditions of high coolant temperature, high intake air temperature, low coolant temperature, and low rotational speed, the limitation of advance correction of the ignition timing based upon the control zones is canceled, by setting the control zone to the control zone 0 in a subroutine in FIG. 9, as hereinafter described, to prevent erroneous determination of control zones to be selected, and hence unnecessary retarding of the ignition timing, thereby avoiding degraded driveability when a high octane fuel is used. Although in the present embodiment, as described above, all the control zone-determining conditions of high coolant temperature, high intake air temperature, low coolant temperature, and low rotation speed are determined, at least one of the conditions may be determined.

At a step S7 in FIG. 2, a control zone determination is carried out.

Figure 9:
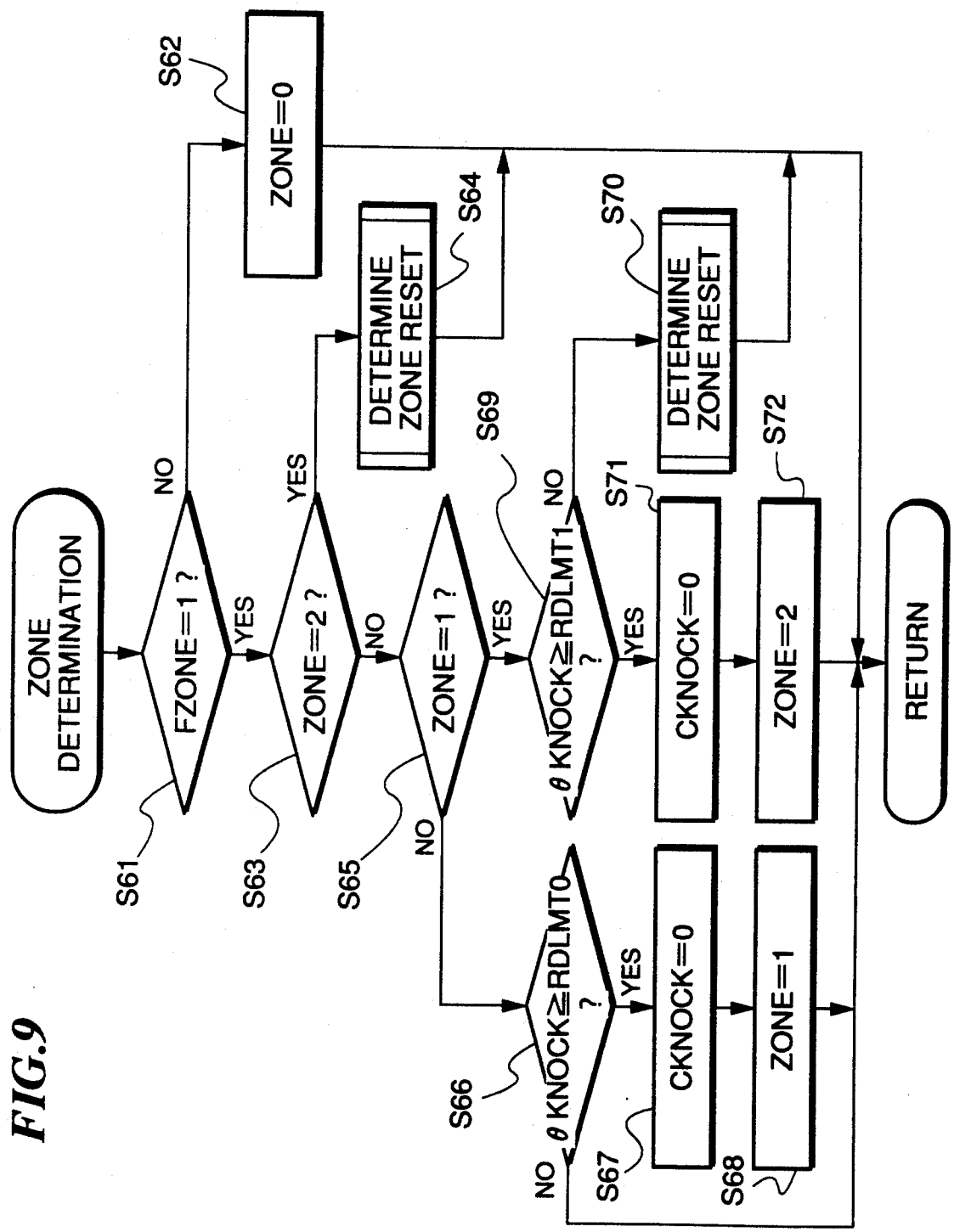
FIG. 9 is a flowchart showing a subroutine for determining control zones.

FIG. 9 shows a subroutine for determining a control zone to be selected, which is executed in synchronism with generation of each TDC signal pulse.

First, at a step S61, it is determined whether or not the flag FZONE has been set to "1" by the control zone-determining condition subroutine of FIG. 8. If the answer is negative (N), the control zone is set to the control zone 0, followed by terminating the program and returning to the main routine of FIG. 2. In this way, in order to avoid an erroneous determination of a control zone to be selected and unnecessary retarding of the ignition timing when a high octane value fuel is used, when the flag FZONE is set to "0" in FIG. 8, the advance correction limitation (FIG. 5) is canceled, by setting the control zone to the control zone 0.

If the answer to the question of the step S61 is affirmative (YES), the program proceeds to a step S63, where it is determined whether or not the control zone 2 is used in the present loop. If the control zone 2 is used, a step S64 is executed, followed by terminating the program. That is, a determination is made as to whether or not the zone resetting can be made, by a zone reset permission-determining subroutine, not shown, and if the zone resetting is permitted, a changeover is made from the control zone 2 to the control zone 1, while it is not permitted, the control zone 2 is continually used, followed by terminating the program.

On the other hand, if the answer to the question of the step S63 is negative (NO), the program proceeds to a step S65 to determine whether or not the control zone 1 is used in the present loop. If the answer is negative (NO), that is, if the control zone 0 is used in the present loop, it is determined at a step S66 whether or not the knocking correction value $\theta KNOCK$ is equal to or greater than the first retard side-discriminating value RDLMT0. If the answer is negative (NO), that is, if $\theta KNOCK < RDLMT0$, it is decided that the zone 0 should continue to be used, followed by terminating the program. On the other hand, if the answer to the question of the step S66 is affirmative (YES), that is, if $\theta KNOCK > RDLMT0$, it is determined that the control zone 1 should be selected, and then the knocking frequency counter CKNOCK is set to "0" at a step S67. Then, the control zone is set to the control zone 1 at a step S68, followed by terminating the program and returning to the main routine.

If the answer to the question of the step S65 is affirmative (YES), that is, if the control zone 1 is used in the present loop, it is determined at a step S69 whether or not the knocking correction value $\theta KNOCK$ is equal to or greater than the second retard side-discriminating value RDLMT1. If the answer is negative (NO), a determination is made as to the zone reset permission, similarly to the step S64. Only when the zone resetting is permitted, the control zone is set to the control zone 0, while if the zone resetting is not permitted, the control zone 1 is continually used at a step S70, followed by terminating the program.

On the other hand, if the answer to the question of the step S69 is negative (NO), that is, if $\theta KNOCK > RDLMT1$, it is determined that the control zone 2 should be selected, and then the knocking frequency counter CKNOCK is reset to "0" at a step S71, and the control zone is set to the control zone 2, followed by terminating the program and returning to the main routine of FIG. 2.

At a step S8 of the main routine in FIG. 2, the ignition timing advance value is calculated for ignition timing control, based on the knocking correction value $\theta KNOCK$ which belongs to the control zone obtained at the step S7, by the use of the following equation (1):

$$\theta IG = \theta IGM - \theta KNOCK$$

As described above, according to the present embodiment, when the engine is operating in at least one of the conditions of low coolant temperature, low rotational speed, high coolant temperature, and high intake air temperature, the control zone determination is inhibited, that is, the advance correction limitation is canceled, to thereby prevent erroneous determination of control zones to be selected and unnecessary retardation of the ignition timing, and hence avoid degradation of the driveability when a high octane value fuel is used.

What is claimed is:

1. In an ignition timing control system for an internal combustion engine, including operating condition-detecting means for detecting operating conditions of said engine including a temperature of said engine, basic ignition timing-calculating means responsive to operating conditions of said engine detected by said operating condition detecting means, for calculating a basic value of ignition timing of said engine, knocking detecting means for detecting knocking occurring in said engine, knocking correction value-calculating means responsive to results of knocking detection from said knocking detecting means, for calculating a knocking correction value for correcting said ignition timing of said engine, advance limit-calculating means responsive to operating conditions of said engine detected by said operating condition-detecting means, for calculating an advance limit value, and advance correction-limiting means for limiting correction of said ignition timing of said engine in a direction of advancing said ignition timing beyond said advance limit value, when said knocking correction value exceeds said advance limit value, the improvement comprising advance correction limitation-canceling means operable when said temperature of said engine detected by said operating condition-detecting means exceeds a predetermined value, for canceling said limitation of correction of said ignition timing in said ignition timing-advancing direction by said advance correction-limiting means.

2. An ignition timing control system as claimed in claim 1, wherein said temperature of said engine is temperature of engine coolant.

3. An ignition timing control system as claimed in claim 1, wherein said temperature of said engine is temperature of intake air supplied to said engine.

4. An ignition timing control system as claimed in claim 2, wherein said advance correction limitation-canceling means is operable when said temperature of said engine detected by said operating condition-detecting means is below a second predetermined value lower than said first predetermined value, for canceling said limitation of correction of said ignition timing in said ignition timing-advancing direction by said advance correction-limiting means.

5. An ignition timing control system as claimed in claim 1, wherein said operating condition-detecting means further includes rotational speed-detecting means for detecting rotational speed of said engine, said advance correction limitation-canceling means being operable when said rotational speed of said engine detected by said rotational speed-detecting means is below a predetermined value, for canceling said limitation of correction of said ignition timing in said ignition timing-advancing direction by said advance correction-limiting means.

6. An ignition timing control system as claimed in any of claims 1 to 5, wherein said advance correction-limiting means comprises means for providing a plurality of control zones suitable for respective different octane values of fuel used in said engine, each of said control zones being defined by an upper limit value and a lower limit value of a retarding amount by which said ignition timing is to be corrected in an ignition timing-retarding direction.

7. An ignition timing control system as claimed in claim 6, wherein said advance limit-calculating means calculates said lower limit of said retarding amount of each of said control zones as said advance limit value.

8. An ignition timing control system as claimed in claim 6, wherein said advance correction limitation-canceling means cancels said limitation of correction of said ignition timing in said ignition timing-advancing direction, by changing one of said control zones which is suitable for a fuel having a lower octane value to another one of said control zones which is suitable for a fuel having a higher octane value.

9. An ignition timing control system as claimed in claim 6, wherein said advance correction-limiting means limits correction of said ignition timing of said engine in said direction of advancing said ignition timing, by changing one of said control zones which is suitable for a fuel having a higher octane value to another one of said control zones which is suitable for a fuel having a lower octane value.

10. In an ignition timing control system for an internal combustion engine, including operating condition-detecting means for detecting operating conditions of said engine including temperature of engine coolant, temperature of intake air supplied to said engine, and rotational speed of said engine, basic ignition timing-calculating means responsive to operating conditions of said engine detected by said operating condition detecting means, for calculating a basic value of ignition timing of said engine, knocking detecting means for detecting knocking occurring in said engine, knocking correction value-calculating means responsive to results of knocking detection from said knocking detecting means, for calculating a knocking correction value for correcting said ignition timing of said engine, advance limit-calculating means responsive to operating conditions of said engine detected by said operating condition-detecting means, for calculating an advance limit value, and advance correction-limiting means for limiting correction of said ignition timing of said engine in a direction of advancing said ignition timing beyond said advance limit value, when said knocking correction value exceeds said advance limit value, the improvement comprising advance correction limitation-canceling means operable to cancel said limitation of correction of said ignition timing in said ignition timing-advancing direction by said advance correction-limiting means when at least one of the following conditions is satisfied:

(1) said temperature of said engine coolant detected by said operating condition-detecting means exceeds a first predetermined value;

(2) said temperature of said engine coolant is below a second predetermined value lower than said first predetermined value;

(3) said temperature of intake air supplied to said engine detected by said operating condition-detecting means is higher than a predetermined value; and (4) said rotational speed of said engine detected by said operating condition-detecting means is lower than a predetermined value.

* * * * *